United States Patent
Maveddat et al.

(10) Patent No.: US 11,726,495 B2
(45) Date of Patent: Aug. 15, 2023

(54) WIRELESS COMMUNICATION COVERAGE BASED VEHICLE ROUTING

(71) Applicant: VIAVI Solutions Inc., San Jose, CA (US)

(72) Inventors: Payam Maveddat, San Jose, CA (US); Christopher Michael Murphy, Bath (GB)

(73) Assignee: VIAVI Solutions Inc., Chandler, AZ (US)

( * ) Notice: Subject to any disclaimer, the term of this patent is extended or adjusted under 35 U.S.C. 154(b) by 976 days.

(21) Appl. No.: 16/276,298

(22) Filed: Feb. 14, 2019

(65) Prior Publication Data

US 2020/0264629 A1 Aug. 20, 2020

(51) Int. Cl.
G05D 1/02 (2020.01)
G01C 21/34 (2006.01)

(52) U.S. Cl.
CPC ....... *G05D 1/0276* (2013.01); *G01C 21/3453* (2013.01); *G01C 21/3476* (2013.01); *G01C 21/3492* (2013.01)

(58) Field of Classification Search
None
See application file for complete search history.

(56) References Cited

U.S. PATENT DOCUMENTS 9,432,929 B1 * 8/2016 Ross ..................... H04W 4/026
9,441,975 B2 * 9/2016 Pylappan .................. G06T 7/60
9,557,183 B1 * 1/2017 Ross ....................... H04W 4/80
9,603,158 B1 * 3/2017 Ross ....................... H04W 4/40
10,036,642 B2 * 7/2018 Ross ..................... G08G 1/202
10,531,318 B1 * 1/2020 Verma .................... H04W 24/02
10,743,331 B2 * 8/2020 Tonshal ............ H04W 72/1205
2011/0137557 A1 * 6/2011 de los Reyes ......... G08G 1/012
342/450
2014/0067257 A1 * 3/2014 Dave .................. G01C 21/3453
701/423
2017/0162057 A1 * 6/2017 Ross ...................... G01S 17/89
2017/0268888 A1 * 9/2017 Blumenberg .......... G01C 21/32
2017/0322040 A1 * 11/2017 Stephens .............. G08G 1/0112
2018/0167780 A1 * 6/2018 Waltermann .......... H04W 4/025

(Continued)

FOREIGN PATENT DOCUMENTS

EP 3261368 A1 * 12/2017 ............. H04W 4/46
WO WO-2019180700 A1 * 9/2019 ........ B60W 60/0015

*Primary Examiner* — Peter D Nolan
*Assistant Examiner* — Michael F Whalen
(74) *Attorney, Agent, or Firm* — Harrity & Harrity, LLP

(57) ABSTRACT

A navigation platform may receive information identifying an origin location and a destination location associated with an autonomous vehicle. The navigation platform may identify one or more candidate route segments for a navigation route from the origin location to the destination location. The navigation platform may receive, based on transmitting a query to a geolocation server, wireless communication coverage information for the one or more candidate route segments. The navigation platform may select, based on the wireless communication coverage information, one or more route segments, from the one or more candidate route segments, for the navigation route. The navigation platform may transmit, to the autonomous vehicle, an instruction to navigate the autonomous vehicle along the navigation route.

20 Claims, 11 Drawing Sheets

(56) References Cited

U.S. PATENT DOCUMENTS

| | | | |
|---|---|---|---|
| 2019/0331501 A1* | 10/2019 | Wang | G05D 1/0274 |
| 2019/0383624 A1* | 12/2019 | Magzimof | H04B 17/373 |
| 2020/0311118 A1* | 10/2020 | Gupta | H04N 21/26216 |
| 2021/0003407 A1* | 1/2021 | Sasaki | G01C 21/3461 |

* cited by examiner

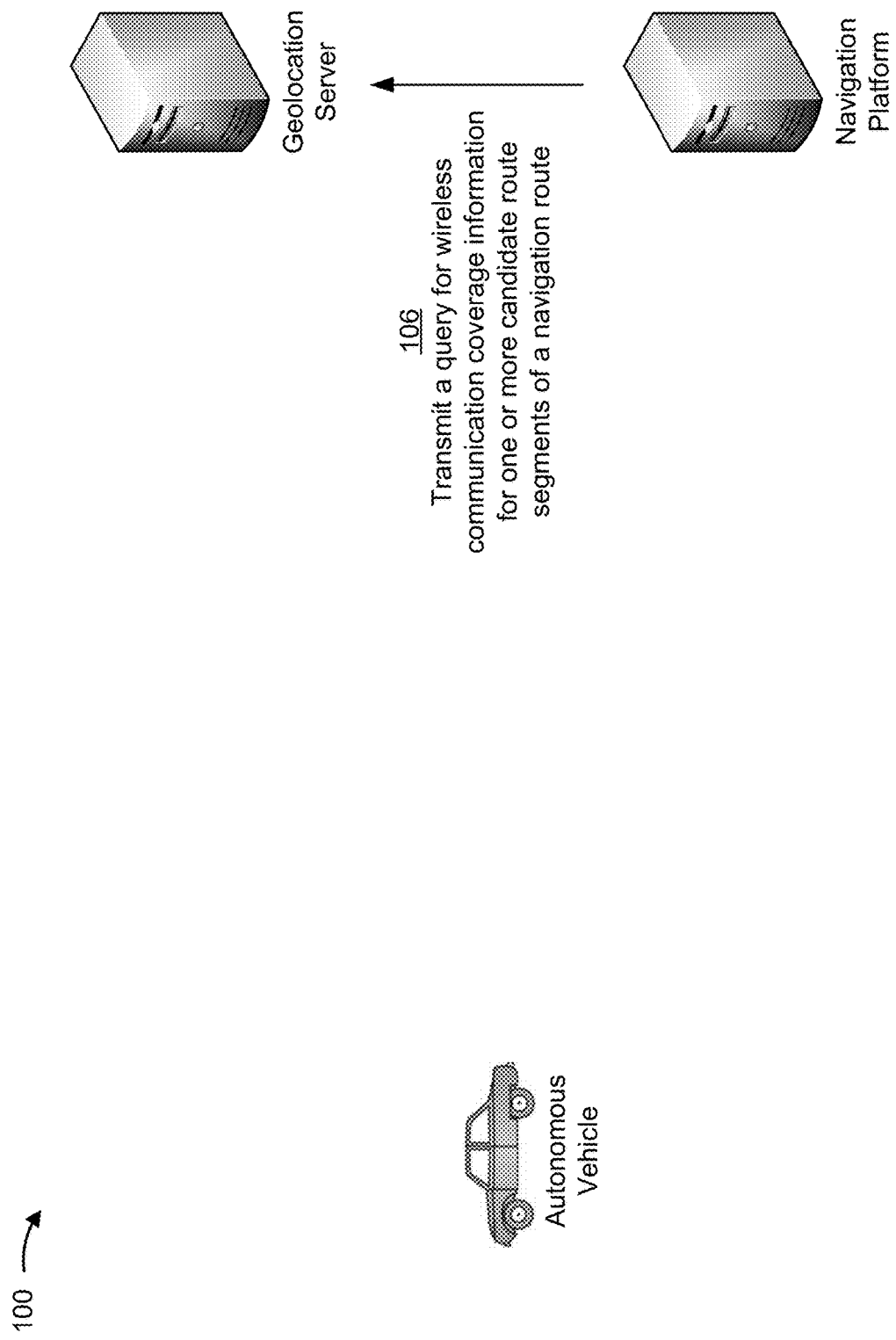

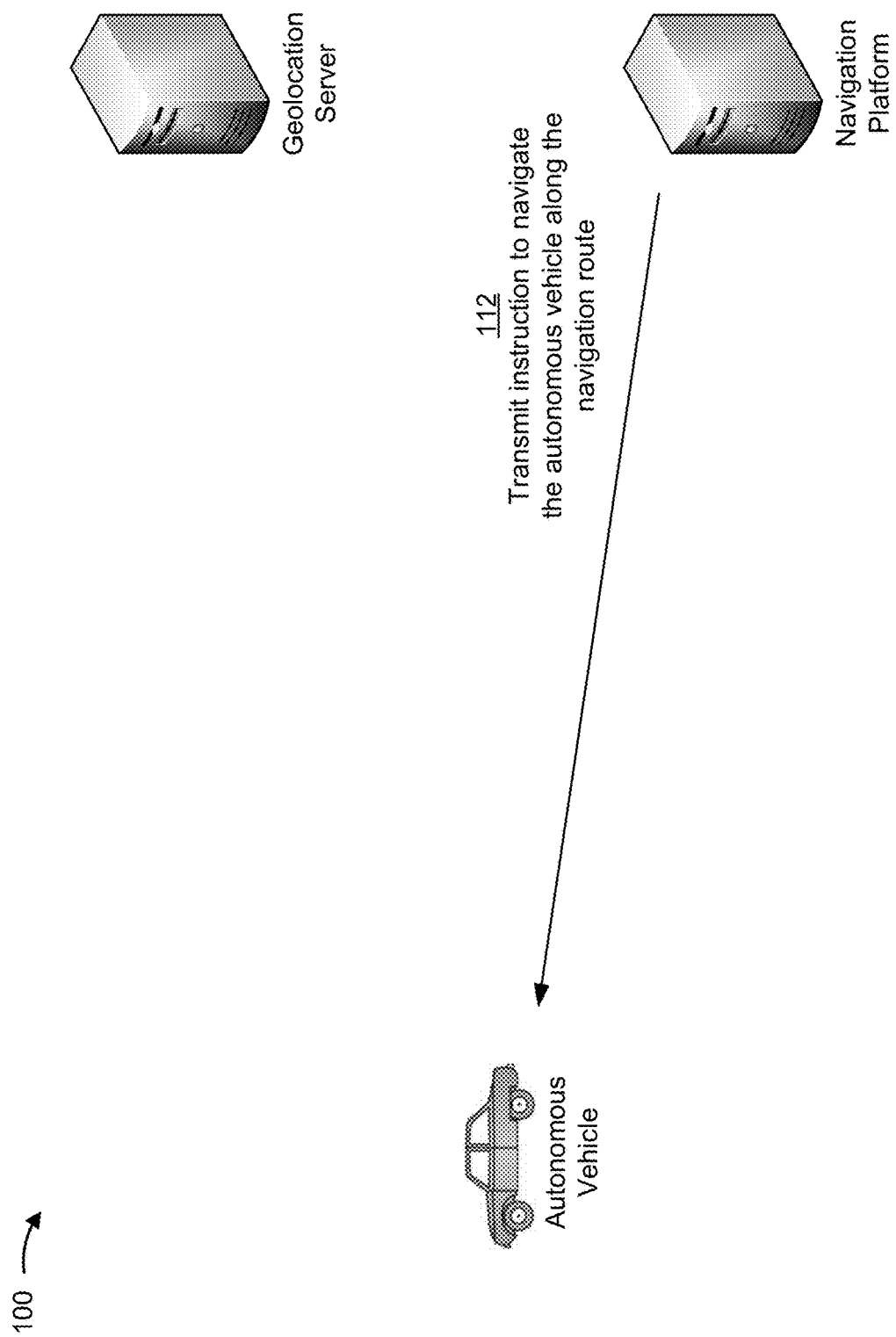

WIRELESS COMMUNICATION COVERAGE BASED VEHICLE ROUTING

BACKGROUND

A navigation platform may generate a navigation route between an origin location and a destination location. The navigation route may include one or more route segments and/or one or more turn-by-turn directions to navigate the vehicle along the one or more route segments.

SUMMARY

According to some implementations, a method may include receiving, at a navigation platform, information identifying an origin location and a destination location associated with an autonomous vehicle. The method may include identifying, by the navigation platform, one or more candidate route segments for a navigation route from the origin location to the destination location. The method may include receiving, by the navigation platform and based on transmitting a query to a geolocation server, wireless communication coverage information for the one or more candidate route segments. The method may include selecting, by the navigation platform and based on the wireless communication coverage information, one or more route segments, from the one or more candidate route segments, for the navigation route. The method may include transmitting, by the navigation platform and to the autonomous vehicle, an instruction to navigate the autonomous vehicle along the navigation route.

According to some implementations, a navigation platform may include one or more memories and one or more processors to receive information identifying an origin location and a destination location associated with an autonomous vehicle. The one or more processors may identify one or more candidate route segments for a navigation route from the origin location to the destination location. The one or more processors may transmit, to a geolocation server, a query for wireless communication coverage information for the one or more candidate route segments. The one or more processors may receive, based on transmitting the query, the wireless communication coverage information. The one or more processors may select, based on the wireless communication coverage information, one or more route segments, from the one or more candidate route segments, for the navigation route. The one or more processors may transmit, to the autonomous vehicle, an instruction to navigate the autonomous vehicle along the navigation route.

According to some implementations, a non-transitory computer-readable medium may store instructions that include one or more instructions that, when executed by one or more processors of a navigation platform, cause the one or more processors to receive information identifying an origin location and a destination location associated with an autonomous vehicle. The one or more instructions may cause the one or more processors to identify one or more candidate route segments for a navigation route from the origin location to the destination location. The one or more instructions may cause the one or more processors to transmit, to a plurality of geolocation servers, respective queries for wireless communication coverage information for the one or more candidate route segments. The one or more instructions may cause the one or more processors to receive, based on transmitting the respective queries, the wireless communication coverage information. The one or more instructions may cause the one or more processors to select, based on the wireless communication coverage information, one or more route segments, from the one or more candidate route segments, for the navigation route. The one or more instructions may cause the one or more processors to transmit, to the autonomous vehicle, an instruction to navigate the autonomous vehicle along the navigation route.

BRIEF DESCRIPTION OF THE DRAWINGS

FIGS. 1A-1F are diagrams of an example implementation described herein.

DETAILED DESCRIPTION

Figure 1A:
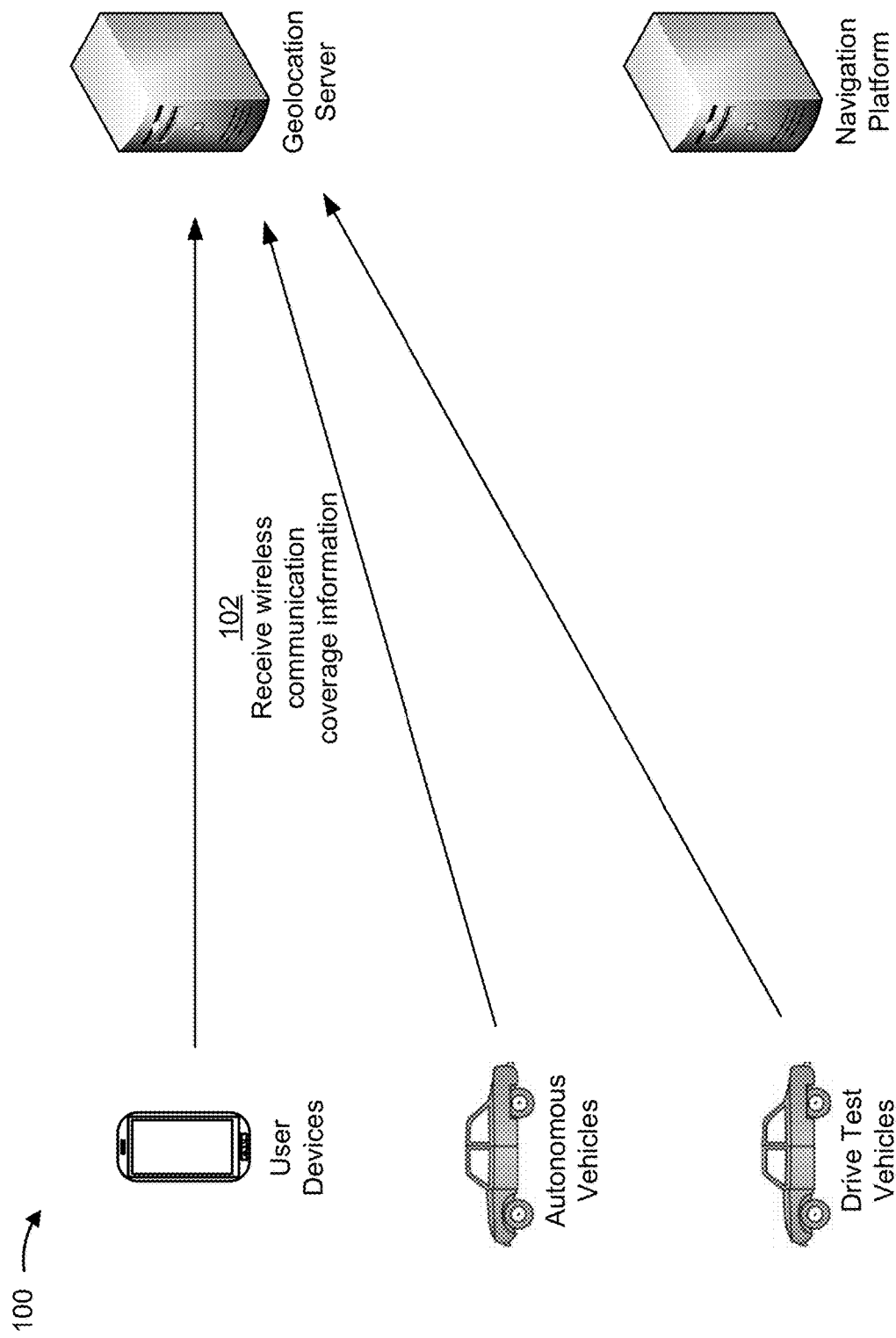

The following detailed description of example implementations refers to the accompanying drawings. The same reference numbers in different drawings may identify the same or similar elements.

Autonomous driving is a technology that is emerging to provide ease-of-use of vehicles, increase the utility and safety of vehicles, enable car-as-a-service and ride-sharing, and/or many other use cases. In some cases, a substantial amount of information may be exchanged between an autonomous vehicle and the navigation platform in order to control the autonomous vehicle. For example, information may be transmitted to the autonomous vehicle regarding a navigation route, the environment, terrain, buildings, speed restrictions, one-way and no entry restrictions, and other environmental features. The information transmitted to the autonomous vehicle may permit autonomous-driving algorithms to recognize static environmental features, which permits the autonomous vehicle to more accurately identify dynamic and transient features, such as pedestrians, cyclists, other vehicles, phases of traffic lights, and/or the like.

In some cases, more time-dependent information may be sent to the autonomous vehicle, such as changes to the navigation route, updates on estimated remaining route duration, special offers for points of interest (POIs), and the like. Moreover, the autonomous vehicle may periodically transmit information to the navigation platform, such as information identifying traffic conditions, traffic incidents, weather and other environmental conditions, and/or the like.

In some cases, a navigation platform may generate a navigation route based on various factors. For example, a navigation platform may generate a navigation route to minimize the overall distance of the navigation route, to minimize the time duration of the navigation route, to minimize cost of the navigation route (e.g., based on fuel, tolls and/or other fees), to include route segments that include scenic or picturesque features, to include route segments that include various types of POIs, and/or a combination of factors. However, in some cases, the navigation platform may generate a navigation route that includes one or more route segments in which wireless communication coverage may not support the amount and/or rate of information that needs to be exchanged between an autonomous vehicle and the navigation platform or no coverage available in certain segments of the route. This may result in the autonomous vehicle traveling along a route segment where there is no wireless communication coverage or insufficient wireless communication coverage to maintain control of the autonomous vehicle, which in turn may result in the autonomous vehicle becoming stranded, may result in the autonomous vehicle traveling into an unsafe condition, may result in delays along the navigation route, and/or the like.

Some implementations described herein provide a navigation management platform that is capable of generating navigation routes based on wireless communication coverage. In some implementations, the navigation platform may generate a candidate navigation route, may verify, with one or more geocoding platforms, that there is sufficient wireless communication coverage along the navigation route, may modify the candidate navigation route based on determining that one or more route segments of the candidate navigation route do not have sufficient wireless communication coverage, and/or the like. In some implementations, the navigation platform may generate a navigation route based on wireless communication coverage information. For example, the navigation platform may select route segments for the navigation route based on wireless communication coverage along the route segments and other factors such as the distances of the route segments, travel time associated with the route segments, and/or the like.

In this way, the navigation platform can ensure that wireless communication coverage along a navigation route can support connectivity with the autonomous vehicle and the amount of information that needs to be exchanged between an autonomous vehicle and the navigation platform. This permits the navigation platform to maintain control of the autonomous vehicle along the navigation route, which in turn prevents the autonomous vehicle becoming stranded and/or traveling into an unsafe condition, reduces delays along the navigation route, and/or the like. Moreover, this permits passengers in the autonomous vehicle to utilize the wireless communication coverage along the navigation route for audio and/or video streaming, video calls, web browsing, and/or the like.

FIGS. 1A-1F are diagrams of an example implementation 100 described herein. As shown in FIGS. 1A-1F, example implementation 100 may include a user device, one or more autonomous vehicles that may be associated with respective autonomous vehicle devices, one or more drive test vehicles that may be associated with respective drive test vehicle devices, a geocoding server, a navigation platform, and/or the like.

As shown in FIG. 1A, and by reference number 102, the geocoding server may include one or more server devices that may receive, store, and provide wireless communication coverage information. In some implementations, geocoding server may receive wireless communication coverage information associated with a plurality of cellular networks (e.g., third generation (3 G) cellular networks, fourth generation (4G) cellular networks, long term evolution (LTE) cellular networks, fifth generation (5G) New Radio (NR) cellular networks, and/or the like), a plurality of wireless networks (e.g., Wi-Fi networks, Bluetooth networks, WiMAX networks, and/or the like), and/or the like. In some implementations, the respective cellular networks and/or wireless networks may be associated with different network operators. For example, a first cellular network may be associated with a first network operator, a second cellular network may be associated with a second network operator, and so on.

In some implementations, implementation 100 may include a plurality of geocoding servers, and each geocoding server, of the plurality of geocoding servers, may be associated with a respective network operator. In this case, each geocoding server, of the plurality of geocoding servers, may receive, store, and/or provide wireless communication coverage information associated with a respective network operator.

The geocoding server may receive the wireless communication coverage information from various sources. For example, the geocoding server may receive the wireless communication coverage from the one or more user devices, from the one or more autonomous vehicle devices (e.g., during autonomous navigation a first autonomous vehicle device may detect wireless communication coverage and may report the wireless communication coverage for use in subsequent routing for a second autonomous vehicle device), from the one or more drive test vehicle devices, and/or other sources.

The one or more user devices may be communicatively connected to one or more cellular networks and/or wireless networks, and may provide, to the geolocation server, information identifying wireless communication coverage measurements and other information associated with the one or more cellular networks and/or wireless networks. For example, a user device may perform a signal strength measurement (e.g., a reference signal received power (RSRP) measurement, a received signal strength indicator (RSSI) measurement, and/or the like), a signal quality measurement (e.g., a reference signal received quality (RSRQ) measurement), a signal-to-noise measurement, a peak uplink and/or downlink throughput measurement, an average uplink and/or downlink throughput measurement, a peak uplink and/or downlink latency measurement, an average uplink and/or downlink latency measurement, and/or the like. The user device may provide the one or more wireless communication coverage measurements, along with information identifying a cellular network or wireless network associated with the one or more wireless communication coverage measurements, information identifying a location associated with the one or more wireless communication coverage measurements (e.g., information identifying world geodetic system (WGS) coordinates associated with the location, a road name associated with the location, a road segment associated with the location, a city and/or state associated with the location, and/or the like). In some implementations, the location associated with the one or more wireless communication coverage measurements may be determined based at least in part on the one or more wireless communication coverage measurements (e.g., based on round-trip time, triangulation, and/or the like).

In some implementations, a user device may provide the information identifying one or more wireless communication coverage measurements and other information to the geocoding platform at periodic intervals, based on receiving an instruction (e.g., from the geocoding platform or another device such as a base station), based on mobility of the user device, and/or the like. In this way, the user device may provide information identifying one or more wireless communication coverage measurements and other information for a plurality of different locations, which aids in the development and understanding of wireless communication coverage for a plurality of different geographic areas.

The one or more autonomous vehicle devices may similarly provide, to the geolocation server, information identifying one or more wireless communication coverage measurements and other information associated with the one or more cellular networks and/or wireless networks. For example, the one or more autonomous vehicle devices may provide the information identifying one or more wireless communication coverage measurements and other information to the geocoding platform at periodic intervals, based on receiving an instruction (e.g., from the geocoding platform or another device such as a base station), based on mobility of the one or more autonomous vehicle devices, and/or the like.

An autonomous vehicle device may include a communication device, associated with an autonomous vehicle, that is capable of communicating with the navigation platform and/or the geocoding server to provide the information identifying one or more wireless communication coverage measurements and other information associated with the one or more cellular networks and/or wireless networks, to receive information identifying a navigation route, navigation route updates, instructions to navigate the autonomous vehicle along the navigation route, information identifying static environmental features associated with a geographic area (e.g., environment, terrain, buildings, speed limits, one-way and no entry restrictions, and/or other environmental features), and/or the like.

The one or more drive vehicle devices may also provide, to the geolocation server, information identifying one or more wireless communication coverage measurements and other information associated with the one or more cellular networks and/or wireless networks. For example, the one or more drive test vehicle devices may provide the information identifying one or more wireless communication coverage measurements and other information to the geocoding platform at periodic intervals, based on receiving an instruction (e.g., from the geocoding platform or another device such as a base station), based on mobility of the one or more drive test vehicle devices, and/or the like.

A drive test vehicle device may include a communication device, associated with a drive test vehicle, that is capable of communicating with the geocoding server to provide the information identifying one or more wireless communication coverage measurements and other information associated with the one or more cellular networks and/or wireless networks. A drive test vehicle may include a vehicle that directed along one or more roads for the purpose of collecting wireless communication coverage information associated with a cellular network and/or wireless network. In some implementations, a drive test vehicle may be associated with a particular network operator and may provide wireless communication coverage information associated with the cellular networks and/or wireless networks associated with the particular network operator. In some implementation, a drive test vehicle may provide wireless communication coverage information associated with cellular networks and/or wireless networks associated with a plurality of network operators. In some implementation, the geolocation server may deploy a drive test vehicle to a particular location to obtain wireless communication coverage information if there is no wireless communication coverage information for the particular location or if the wireless communication coverage information for the particular location is out of date. In some implementations, the geolocation server may deploy a drive test vehicle to a particular location to obtain wireless communication coverage information in response to a threshold number of autonomous vehicles requesting navigation at or near the particular location.

In some implementations, the geocoding server may receive the wireless communication coverage information associated with the plurality of cellular networks and/or plurality of wireless networks, and may store the wireless communication coverage information in a data structure (e.g., a database, a file system, one or more electronic files, and/or the like).

In some implementations, the geocoding server may supplement the wireless communication coverage information by performing one or more analyses on the wireless communication coverage information provided by the one or more user devices, the one or more autonomous vehicle devices, and/or the one or more drive test vehicle devices. For example, the geocoding server may generate wireless communication coverage maps based on the wireless communication coverage measurements performed by the one or more user devices, the one or more autonomous vehicle devices, and/or the one or more drive test vehicle devices. In some implementations, a wireless communication coverage map may overlay wireless communication coverage measurement data over one or more geographic areas and/or road segments. For example, the geocoding server may generate a wireless communication coverage map that includes an overlay of wireless communication coverage types (e.g., 3G, 4G, LTE, 5G, Wi-Fi, and/or the like) in a particular geographic area and/or road segment, that includes an overlay of a signal strength range or an average signal strength in a particular geographic area and/or road segment, that includes an overlay of a signal quality range or an average signal quality in a particular geographic area and/or road segment, includes an overlay of peak or average downlink and/or uplink throughput (or a downlink and/or uplink throughput range) in a particular geographic area and/or road segment, that includes an overlay of peak or average downlink and/or uplink latency (or a downlink and/or uplink latency range) in a particular geographic area and/or road segment, and/or the like.

As another example, the geocoding server may determine whether wireless communication coverage in a particular geographic area, road segment, and/or the like, is capable of satisfying one or more service requirements, such as an audio streaming requirement (i.e., whether the wireless communication coverage is capable of supporting audio streaming, whether the wireless communication coverage is capable of supporting various bit rates of audio streaming, and/or the like), a video streaming requirement (i.e., whether the wireless communication coverage is capable of supporting video streaming, whether the wireless communication coverage is capable of supporting various bit rates or resolutions of video streaming, and/or the like), a video call requirement (i.e., whether the wireless communication coverage is capable of supporting video calling), a data rate requirement (i.e., whether the wireless communication coverage is capable of supporting a particular uplink and/or downlink data transfer rate), and/or the like.

As another example, the geocoding server may collect usage data associated with the one or more cellular networks and/or wireless networks, and may identify peak network capacity usage times throughout the day, may identify estimated available network capacity throughout the day, and/or the like.

Figure 1B:
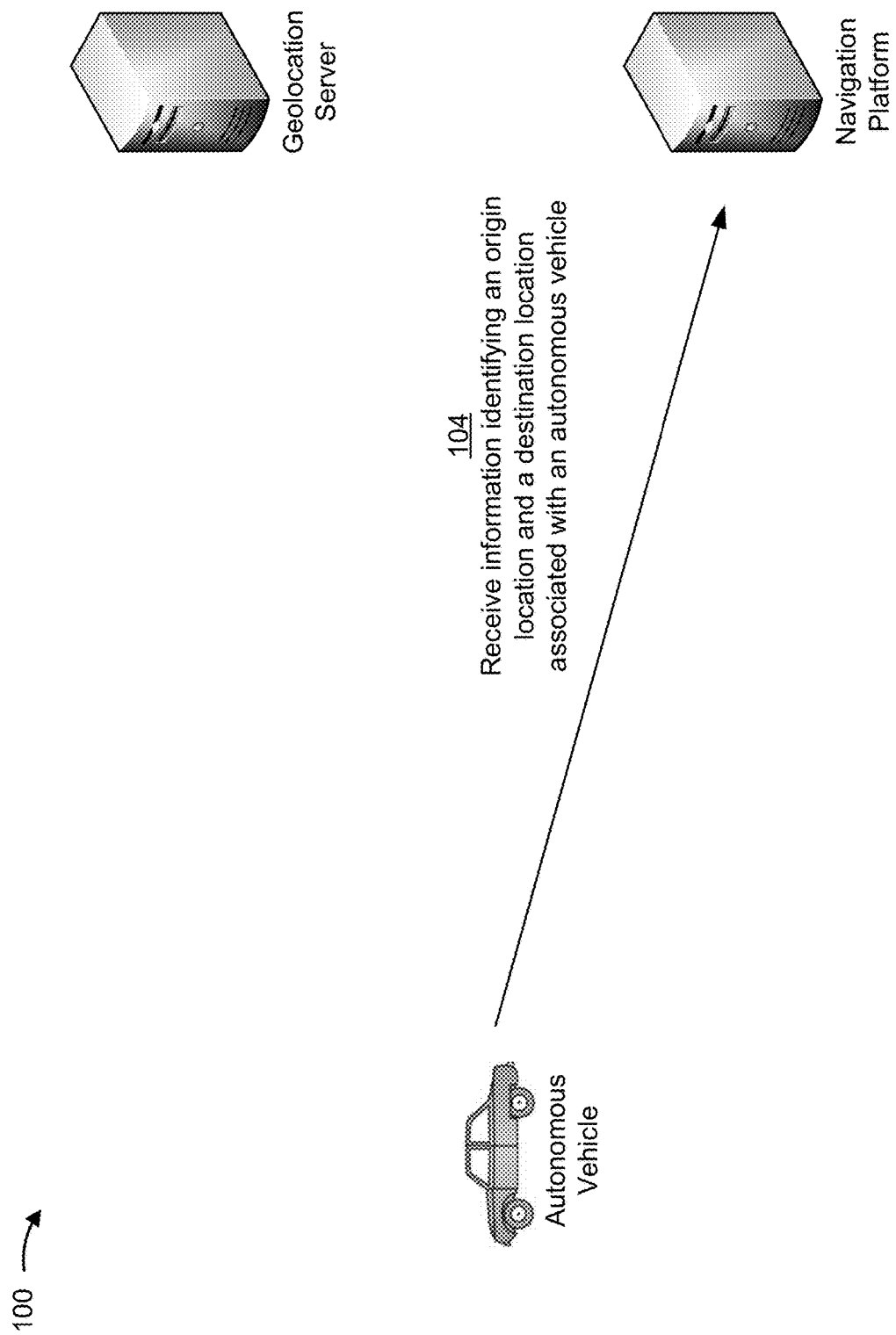

Turning to FIG. 1B, in some implementations, the navigation platform may generate and/or verify navigation routes based on the wireless communication coverage information stored by the geolocation server. In some implementations, the navigation platform may generate and/or verify navigation routes for use by the one or more user devices (e.g., a user of a user device may use a navigation route to navigate a non-autonomous vehicle or semi-autonomous vehicle), for use by the one or more autonomous vehicle devices (e.g., an autonomous vehicle device may use a navigation route to autonomously navigate an associated autonomous vehicle), and/or the like.

As shown by reference number 104, to generate and/or verify a navigation route, the navigation platform may receive information identifying an origin location. The origin location may include a starting point or location for a navigation route. The origin location may be associated with a location of an autonomous vehicle, a location associated with a POI, and/or another location. The information identifying the origin location may include information identifying a street address, positioning coordinates associated with the origin location, and/or the like.

The navigation platform may further receive information identifying a destination location. The destination location may include an end point or location for the navigation route. The information identifying the destination location may include information identifying a street address associated with the destination location, a city and state associated with the destination location, a POI associated with the destination location, positioning coordinates associated with the destination location, and/or the like.

Turning to FIG. 1C, the navigation platform may generate the navigation route such that the navigation route includes one or more route segments for navigating the autonomous vehicle from the origin location to the destination location. A route segment may include a portion of a navigation route or an entire navigation route. In some implementations, a route segment may include a portion of a route between two turn-by-turn directions. In some implementations, a route segment may include a portion of a road (e.g., five-mile stretches of roads, one-mile stretches of roads, and/or the like).

In some implementations, the navigation platform may generate the entire navigation route by selecting one or more candidate route segments that comprise the entire navigation route. In this case, the navigation platform may verify, based on the wireless communication coverage information stored by the geolocation server, that wireless communication coverage along the one or more candidate route segments can support communication between the navigation platform and the autonomous vehicle device along the entire navigation route.

In some implementations, the navigation platform may build the navigation route using the wireless communication coverage information stored by the geolocation server. In this case, the navigation platform may identify a plurality of candidate route segments for each route segment along the navigation route, and may select the candidate route segments, for the navigation route, that have wireless communication coverage that can support communication between the navigation platform and the autonomous vehicle device along the entire navigation route.

As shown in by reference number 106, to select the one or more route segments for the navigation route, the navigation platform may transmit, to the geocoding server, a query for wireless communication coverage information associated with one or more candidate route segments. In some implementations, if a plurality of cellular networks and/or wireless networks provide wireless communication coverage along the one or more candidate route segments, the wireless communication coverage information may be stored by a plurality of geocoding servers (e.g., which may be associated with respective network operators). In this case, the navigation platform may transmit the query to each of the plurality of geocoding servers.

In some implementations, the navigation platform may select the one or more candidate route segments based on various factors, such as a travel distance associated with the one or more candidate route segments, a travel time associated with the one or more candidate route segments, predicted traffic conditions for the one or more candidate route segments, real-time traffic conditions for the one or more candidate route segments, user preferences (e.g., a user preference that the navigation route include one or more particular POIs or types of POIs, a user preference that the navigation route is to not include particular types of roads, such as toll roads, highways, and/or the like, a user preference that the navigation route is to include scenic or picturesque features, and/or the like), and/or the like. In some implementations, the navigation platform may select the one or more candidate route segments based on a routing algorithm, such as a pathfinding algorithm, Dijkstra's algorithm, and/or the like.

In some implementations, the query may include a request for wireless communication coverage capabilities along the one or more candidate route segments, such as a wireless coverage capability (e.g., an indication of whether an entire route segment includes wireless communication coverage and/or a type of wireless communication coverage), an average throughput capability or throughput capability range, an average latency capability or average latency capability range, an average signal strength capability or average signal strength capability range, an average signal quality capability or average signal strength capability range, a network capacity capability, and/or the like.

In some implementations, the query may include a request for an indication of whether the wireless communication coverage along the one or more candidate route segments satisfies one or more user-specified requirements, such as such as an audio streaming requirement (i.e., whether the wireless communication coverage is capable of supporting audio streaming, whether the wireless communication coverage is capable of supporting various bit rates of audio streaming, and/or the like), a video streaming requirement (i.e., whether the wireless communication coverage is capable of supporting video streaming, whether the wireless communication coverage is capable of supporting various bit rates or resolutions of video streaming, and/or the like), a video call requirement (i.e., whether the wireless communication coverage is capable of supporting video calling), a data rate requirement (i.e., whether the wireless communication coverage is capable of supporting a particular uplink and/or downlink data transfer rate), a network operator requirement (e.g., whether a particular network operator operates a particular cellular network and/or wireless network along the one or more candidate route segments), and/or the like.

In some implementations, the query may include a request for an indication of whether the wireless communication coverage along the one or more candidate route segments satisfies one or more wireless communication coverage thresholds, such as a signal strength threshold, a signal quality threshold, a throughput threshold, a route segment coverage threshold, a latency threshold, and/or the like. In some implementations, the query may include a request for a recommendation for selecting one or more route segments from a plurality of candidate route segments.

Figure 1D:
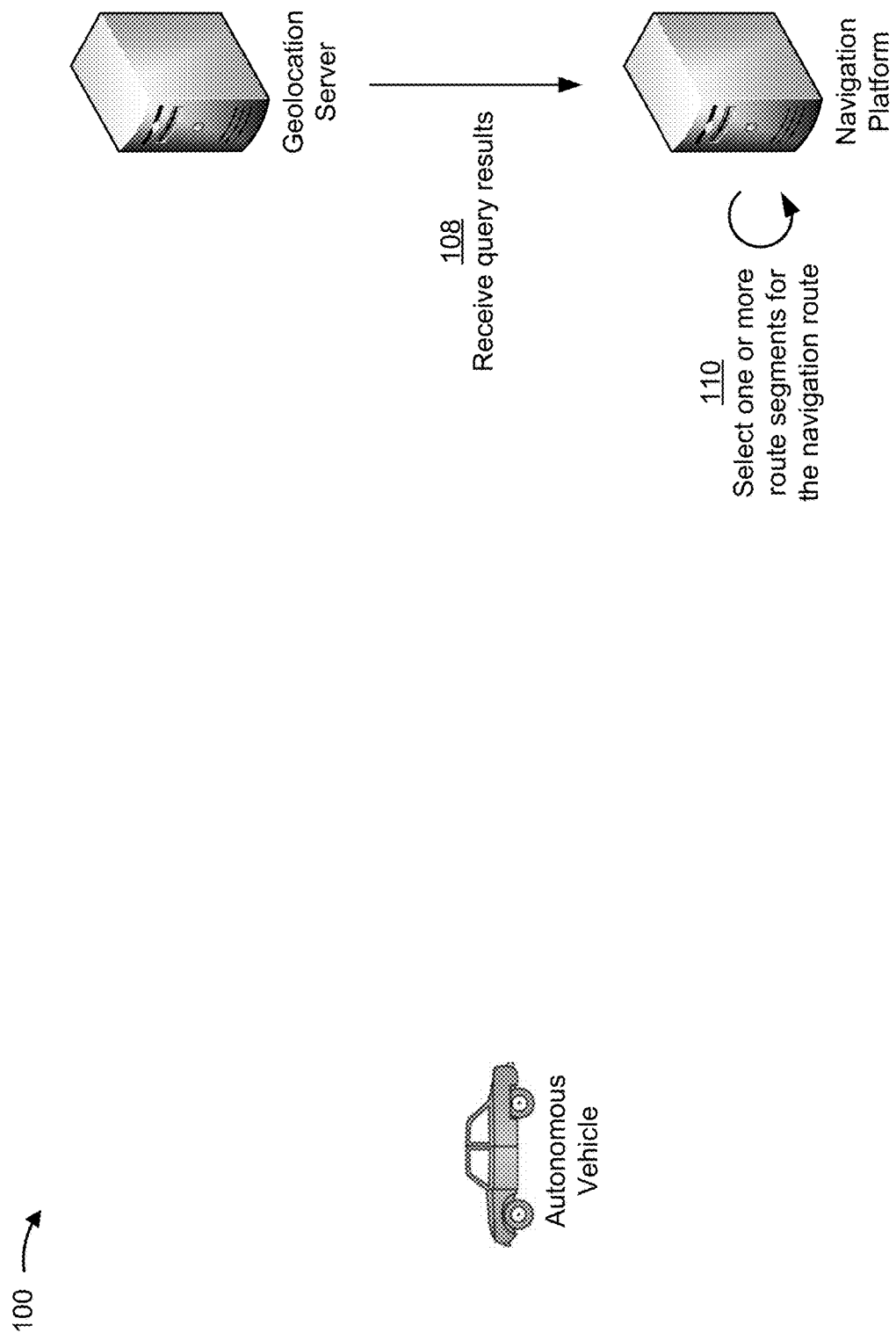

Turning to FIG. 1D, and as shown by reference number 108, the geocoding server may receive the query and may provide query results to the navigation platform. As shown by reference number 110, the navigation platform may receive the query results and may select, based on the query results, one or more route segments for the navigation route.

If the one or more candidate route segments comprise the entire navigation route, the navigation platform may verify, based on the query results, whether the wireless communication coverage along the one or more candidate route segments can support communication between the navigation platform and the autonomous vehicle device along the entire navigation route, may verify whether the wireless communication coverage along the one or more candidate route segments satisfies the one or more user-specified requirements, and/or the like.

In some implementations, the navigation platform may determine that the wireless communication coverage along the one or more candidate route segments can support communication between the navigation platform and the autonomous vehicle device along the entire navigation route if the wireless communication coverage capabilities, of the wireless communication coverage along the one or more candidate route segments can support communication between the navigation platform and the autonomous vehicle device along the entire navigation route.

In some implementations, the navigation platform may determine that the wireless communication coverage along the one or more candidate route segments can support communication between the navigation platform and the autonomous vehicle device along the entire navigation route if the query results indicates that the wireless communication coverage along the one or more candidate route segments satisfies the one or more wireless communication coverage thresholds.

In some implementations, if the navigation platform determines that a candidate route segment, of the one or more candidate route segments, cannot support communication between the navigation platform and the autonomous vehicle device and/or does not satisfy a user-specified requirement, the navigation platform may select another candidate route segment to replace the candidate route segment, and may determine whether the other candidate route segment can support communication between the navigation platform and the autonomous vehicle device and satisfies the one or more user-specified requirements. The navigation platform may iteratively replace candidate route segments until the navigation platform identifying candidate route segments along the entire navigation route, that can support communication between the navigation platform and the autonomous vehicle device and satisfy the one or more user-specified requirements.

If the one or more candidate route segments are for selection of a particular route segment along the navigation route (e.g., such as where the navigation platform is building the navigation route), the navigation platform may determine, based on the query results, whether the wireless communication coverage along any of the one or more candidate route segments can support communication between the navigation platform and the autonomous vehicle device, may verify whether the wireless communication coverage along any of the one or more candidate route segments satisfies the one or more user-specified requirements, and/or the like.

In some implementations, if the navigation platform determines that only one of the candidate route segments can support communication between the navigation platform and the autonomous vehicle device and/or satisfies the one or more user-specified requirements, the navigation platform may select the candidate route segment as the route segment.

In some implementations, if the navigation platform determines that two or more candidate route segments can support communication between the navigation platform and the autonomous vehicle device and/or satisfies the one or more user-specified requirements, the navigation platform may select the candidate route segment, of the two or more candidate route segments, based on various criteria. As an example, the navigation platform may select the candidate route segment, of the two or more candidate route segments, based on which candidate route segment has the greatest wireless communication coverage capabilities, based on non-wireless communication coverage factors (e.g., based on which candidate route segment has the least travel distance, the least travel time, the lowest cost, predicted and/or real-time traffic conditions, and/or the like), and/or the like.

In some implementations, if the navigation platform determines that no candidate route segment satisfies all of the user-specified requirements, the navigation platform can select the candidate route segment, for the route segment, that satisfies the greatest quantity of user-specified requirements, that satisfies the highest-weighted user-specified parameters, based on non-wireless communication coverage factors, and/or the like.

In some implementations, the navigation platform can weight various route selection parameters, such as wireless communication coverage, travel distance, travel time, whether the one or more user-specified requirements are satisfied, and/or the like, in order to select route segments. For example, if the navigation platform determines that a particular candidate route segment involves a relatively short drop in wireless communication coverage (e.g., 10 seconds, 20 seconds, etc.), but satisfies all user-specified requirements, whereas other candidate route segments do not satisfy as many user-specified requirements and/or involve significantly longer travel time and/or travel duration, the navigation platform may still select the particular candidate route segment as a route segment for the navigation route. In this case, the navigation platform may transmit additional information to the autonomous vehicle device prior to the route segment, may deploy additional sensors to mitigate the effects of the drop in wireless communication coverage, and/or the like.

In some implementations, if the wireless communication coverage information includes a recommendation for selecting one or more route segments from a plurality of candidate route segments, the navigation platform may select the one or more route segments based on the recommendation. In some implementations, the wireless communication coverage information may include information identifying one or more modifications to a navigation routes, information identifying one or more alternative candidate route segments for a candidate route segment identified in the query, and/or the like.

Turning to FIG. 1E, and as shown by reference number 112, the navigation platform may transmit, to the autonomous vehicle device associated with the autonomous vehicle, information identifying the navigation route and an instruction to navigate the autonomous vehicle along the navigation route. The autonomous vehicle device may control the autonomous vehicle, based on receiving the instruction, to traverse the one or more route segments included in the navigation route.

Figure 1F:
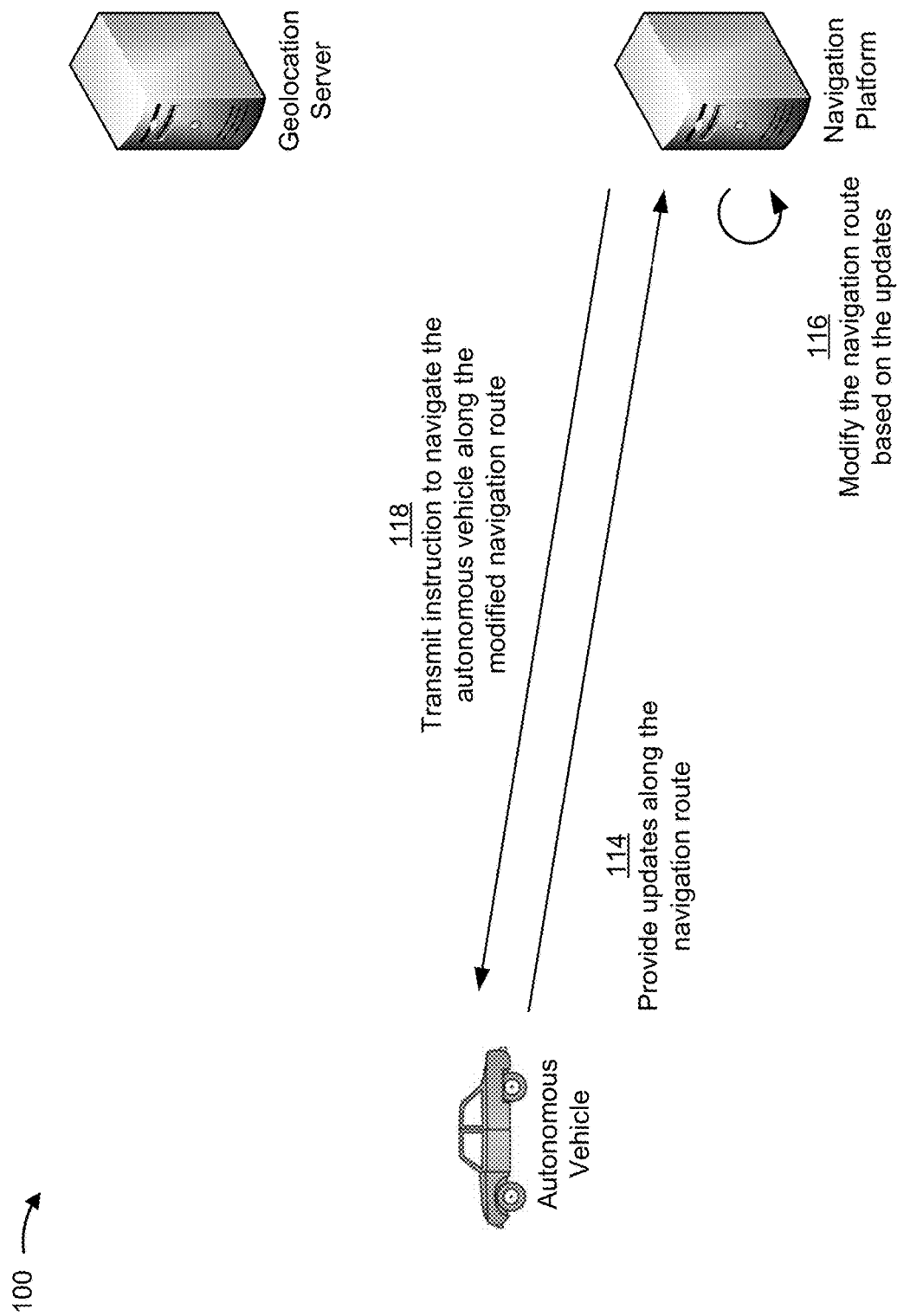

Turning to FIG. 1F, and as shown by reference number 114, the autonomous vehicle device may provide updates, to the navigation platform, as the autonomous vehicle traverses the navigation route. In some implementations, the updates may include information identifying wireless communication coverage measurements along the one or more route segments. The navigation platform may provide the information identifying wireless communication coverage measurements to the geolocation platform so that the geolocation platform may continuously revise the wireless communication coverage information stored by the geolocation server. In some implementations, the updates may include traffic updates, wireless communication coverage updates (such as information identifying network outages, estimated available network capacity, dead zones or areas without wireless communication coverage, and/or the like), weather updates, and/or the like.

As shown by reference number 116, the navigation platform may receive the updates and may modify the navigation route (and subsequent navigation routes generated for other vehicles) based on the updates. For example, the navigation platform may determine that a traffic incident occurred in a route segment of the navigation route, and accordingly may select a replacement route segment using the techniques described above in connection with reference numbers 106-110. As another example, the navigation platform may determine that a network outage has occurred in a route segment of the navigation route, and accordingly may select a replacement route segment using the techniques described above in connection with reference numbers 106-110. As another example, the navigation platform may determine that available network capacity along a route segment may not be able to support communication between the navigation platform and the autonomous vehicle device, and accordingly may select a replacement route segment using the techniques described above in connection with reference numbers 106-110.

As shown by reference number 118, the navigation platform may transmit, to the autonomous vehicle device associated with the autonomous vehicle, information identifying the modified navigation route and an instruction to navigate the autonomous vehicle along the modified navigation route. The autonomous vehicle device may control the autonomous vehicle, based on receiving the instruction, to traverse the one or more route segments included in the modified navigation route.

In this way, the navigation platform can ensure that wireless communication coverage along a navigation route can support connectivity with the autonomous vehicle and the amount of information that needs to be exchanged between an autonomous vehicle and the navigation platform. This permits the navigation platform to maintain control of the autonomous vehicle along the navigation route, which in turn prevents the autonomous vehicle becoming stranded and/or traveling into an unsafe condition, reduces delays along the navigation route, and/or the like. Moreover, this permits passengers in the autonomous vehicle to utilize the wireless communication coverage along the navigation route for audio and/or video streaming, video calls, web browsing, and/or the like.

As indicated above, FIGS. 1A-1F are provided merely as one or more examples. Other examples may differ from what is described with regard to FIGS. 1A-1F.

Figure 2:
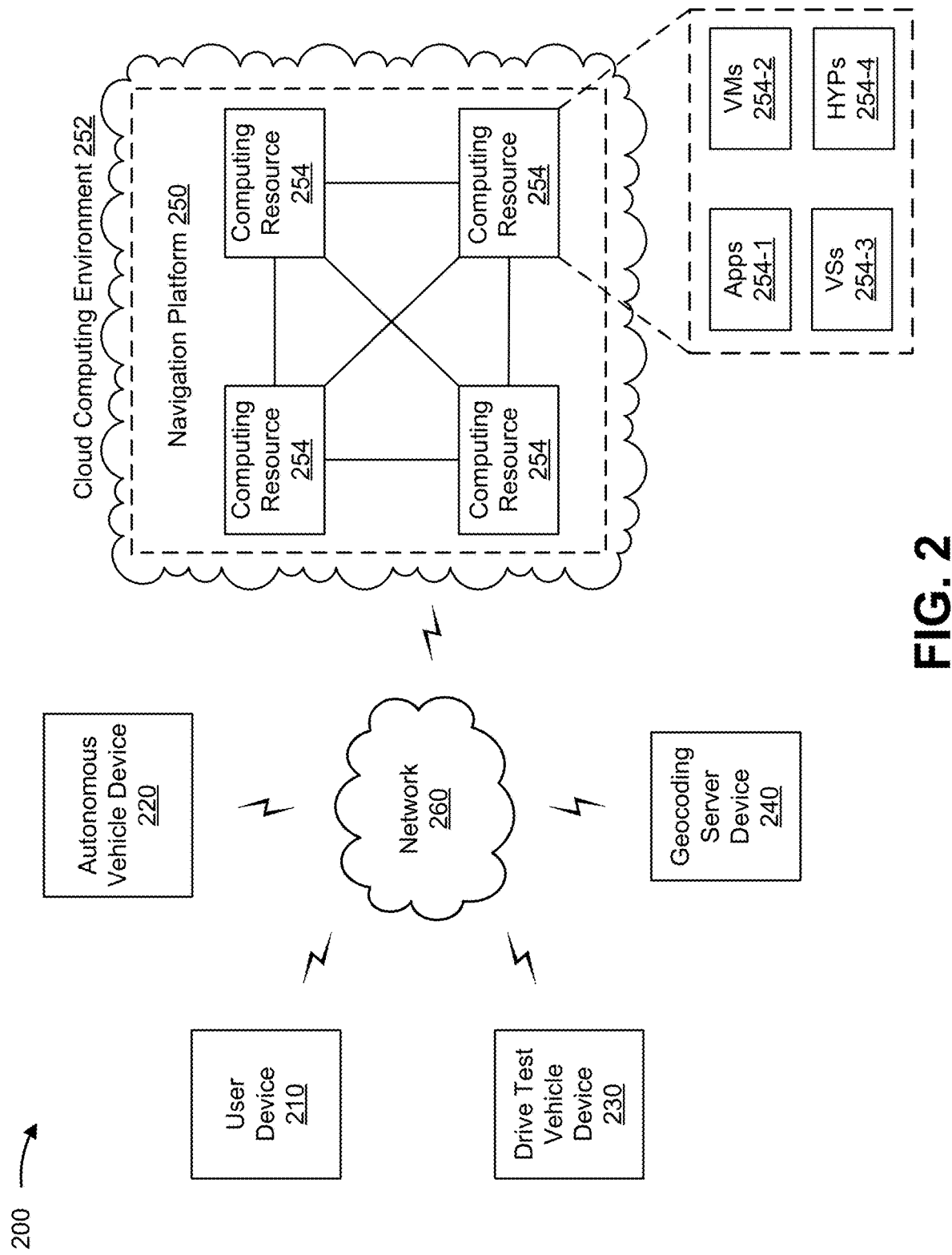
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include a user device 210, an autonomous vehicle device 220, a drive test vehicle device 230, a geocoding server device 240, a navigation platform 250 that includes one or more cloud computing resources 254, and a network 260. Devices of environment 200 may interconnect via wired connections, wireless connections, or a combination of wired and wireless connections.

User device 210 includes one or more devices capable of receiving, generating, storing, processing, and/or providing information associated with wireless communication coverage based vehicle routing. For example, user device 210 may include a mobile phone (e.g., a smart phone, etc.), a laptop computer, a tablet computer, a wearable communication device (e.g., a smart wristwatch, a pair of smart eyeglasses, etc.), or a similar type of device. In some implementations, user device 210 may perform one or more wireless communication coverage measurements associated with one or more cellular networks and/or wireless networks, such as any of the wireless communication coverage measurements described above in connection with FIGS. 1A-1F. In some implementations, user device 210 may transmit, to geocoding server device 240, information identifying the wireless communication coverage measurements and other information associated with the one or more cellular networks and/or wireless networks.

Autonomous vehicle device 220 includes one or more devices capable of receiving, generating, storing, processing, and/or providing information associated with wireless communication coverage based vehicle routing. For example, autonomous vehicle device 220 may include a mobile phone (e.g., a smart phone, etc.), a laptop computer, a tablet computer, a wearable communication device (e.g., a smart wristwatch, a pair of smart eyeglasses, etc.), an on-board diagnostics (ODB) device (e.g., an ODB-II device and/or a similar type of ODB device), electronic control unit (ECU), a vehicle controller, and/or a similar type of device.

In some implementations, autonomous vehicle device 220 may be associated and/or included in an autonomous vehicle. In some implementations, autonomous vehicle device 220 may transmit various types of information to geocoding server device 240 and/or navigation platform 250, such as information identifying an origin location and a destination location associated with the autonomous vehicle, information identifying one or more wireless communication coverage measurements associated with one or more cellular networks and/or wireless networks, such as any of the wireless communication coverage measurements described above in connection with FIGS. 1A-1F, other information associated with the one or more cellular networks and/or wireless networks, information identifying one or more updates as the autonomous vehicle traverses a navigation route, and/or the like. In some implementations, autonomous vehicle device 220 may receive, from navigation platform 250, information identifying a navigation route and an instruction to navigate the autonomous vehicle along the navigation route.

Drive test vehicle device 230 includes one or more devices capable of receiving, generating, storing, processing, and/or providing information associated with wireless communication coverage based vehicle routing. For example, drive test vehicle device 230 may include a mobile phone (e.g., a smart phone, etc.), a laptop computer, a tablet computer, a wearable communication device (e.g., a smart wristwatch, a pair of smart eyeglasses, etc.), an ODB device (e.g., an ODB-II device and/or a similar type of ODB device), electronic control unit (ECU), a vehicle controller, and/or a similar type of device.

In some implementations, drive test vehicle device 230 may be associated and/or included in a drive test vehicle. In some implementations, drive test vehicle device 230 may transmit various types of information to geocoding server device 240, such as information identifying one or more wireless communication coverage measurements associated with one or more cellular networks and/or wireless networks, such as any of the wireless communication coverage measurements described above in connection with FIGS. 1A-1F, other information associated with the one or more cellular networks and/or wireless networks, and/or the like.

Geocoding server device 240 includes one or more devices capable of receiving, generating, storing, processing, and/or providing information associated with wireless communication coverage based vehicle routing. For example, geocoding server device 240 may include a server device, a laptop computer, a tablet computer, a data center, a cloud-based server, and/or a similar type of device.

In some implementations, geocoding server device 240 may receive information identifying one or more wireless communication coverage measurements associated with one or more cellular networks and/or wireless networks, such as any of the wireless communication coverage measurements described above in connection with FIGS. 1A-1F, other information associated with the one or more cellular networks and/or wireless networks, and/or the like. In some implementations, geocoding server device 240 may receive, from navigation platform 250, a query for wireless communication coverage information, and may provide various types of wireless communication coverage information in response to the query.

Navigation platform 250 includes one or more computing resources assigned to wireless communication coverage based vehicle routing. For example, navigation platform 250 may be a platform implemented by cloud computing environment 252 that may receive the information identifying the origin location and the destination location associated with the autonomous vehicle, and/or the like; may provide a query, to geocoding server device 240, for wireless communication coverage information associated with one or more candidate route segments; may select one or more route segments, form the one or more candidate route segments, for a navigation route based on the wireless communication coverage information; may provide, to autonomous vehicle device 220, information identifying the navigation route and an instruction to navigate the autonomous vehicle along the navigation route; and/or the like. In some implementations, navigation platform 250 is implemented by computing resources 254 of cloud computing environment 252.

Navigation platform 250 may include a server device or a group of server devices. In some implementations, navigation platform 250 may be hosted in cloud computing environment 252. Notably, while implementations described herein describe navigation platform 250 as being hosted in cloud computing environment 252, in some implementations, navigation platform 250 may not be cloud-based or may be partially cloud-based.

Cloud computing environment 252 includes an environment that delivers computing as a service, whereby shared resources, services, etc. may be provided to navigation platform 250. Cloud computing environment 252 may provide computation, software, data access, storage, and/or other services that do not require end-user knowledge of a physical location and configuration of a system and/or a device that delivers the services. As shown, cloud computing environment 252 may include navigation platform 250 and computing resource 254.

Computing resource 254 includes one or more personal computers, workstation computers, server devices, or another type of computation and/or communication device. In some implementations, computing resource 254 may host navigation platform 250. The cloud resources may include compute instances executing in computing resource 254, storage devices provided in computing resource 254, data transfer devices provided by computing resource 254, etc. In some implementations, computing resource 254 may communicate with other computing resources 254 via wired connections, wireless connections, or a combination of wired and wireless connections.

As further shown in FIG. 2, computing resource 254 may include a group of cloud resources, such as one or more applications ("APPs") 254-1, one or more virtual machines ("VMs") 254-2, virtualized storage ("VSs") 254-3, one or more hypervisors ("HYPs") 254-4, or the like.

Application 254-1 includes one or more software applications that may be provided to or accessed by user device 210, autonomous vehicle device 220, drive test vehicle device 230, geocoding server device 240, and/or the like. Application 254-1 may eliminate a need to install and execute the software applications on user device 210, autonomous vehicle device 220, drive test vehicle device 230, and/or geocoding server device 240. For example, application 254-1 may include software associated with navigation platform 250 and/or any other software capable of being provided via cloud computing environment 252. In some implementations, one application 254-1 may send/receive information to/from one or more other applications 254-1, via virtual machine 254-2.

Virtual machine 254-2 includes a software implementation of a machine (e.g., a computer) that executes programs like a physical machine. Virtual machine 254-2 may be either a system virtual machine or a process virtual machine, depending upon use and degree of correspondence to any real machine by virtual machine 254-2. A system virtual machine may provide a complete system platform that supports execution of a complete operating system ("OS"). A process virtual machine may execute a single program, and may support a single process. In some implementations, virtual machine 254-2 may execute on behalf of a user (e.g., a user of user device 210, drive test vehicle device 230, geocoding server device 240, and/or the like), and may manage infrastructure of cloud computing environment 252, such as data management, synchronization, or long-duration data transfers.

Virtualized storage 254-3 includes one or more storage systems and/or one or more devices that use virtualization techniques within the storage systems or devices of computing resource 254. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 254-4 provides hardware virtualization techniques that allow multiple operating systems (e.g., "guest operating systems") to execute concurrently on a host computer, such as computing resource 254. Hypervisor 254-4 may present a virtual operating platform to the guest operating systems, and may manage the execution of the guest operating systems. Multiple instances of a variety of operating systems may share virtualized hardware resources.

Network 260 includes one or more wired and/or wireless networks. For example, network 260 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, a wireless network (e.g., a Wi-Fi network, a WiMAX network, a WLAN, a Bluetooth network, and/or the like), or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
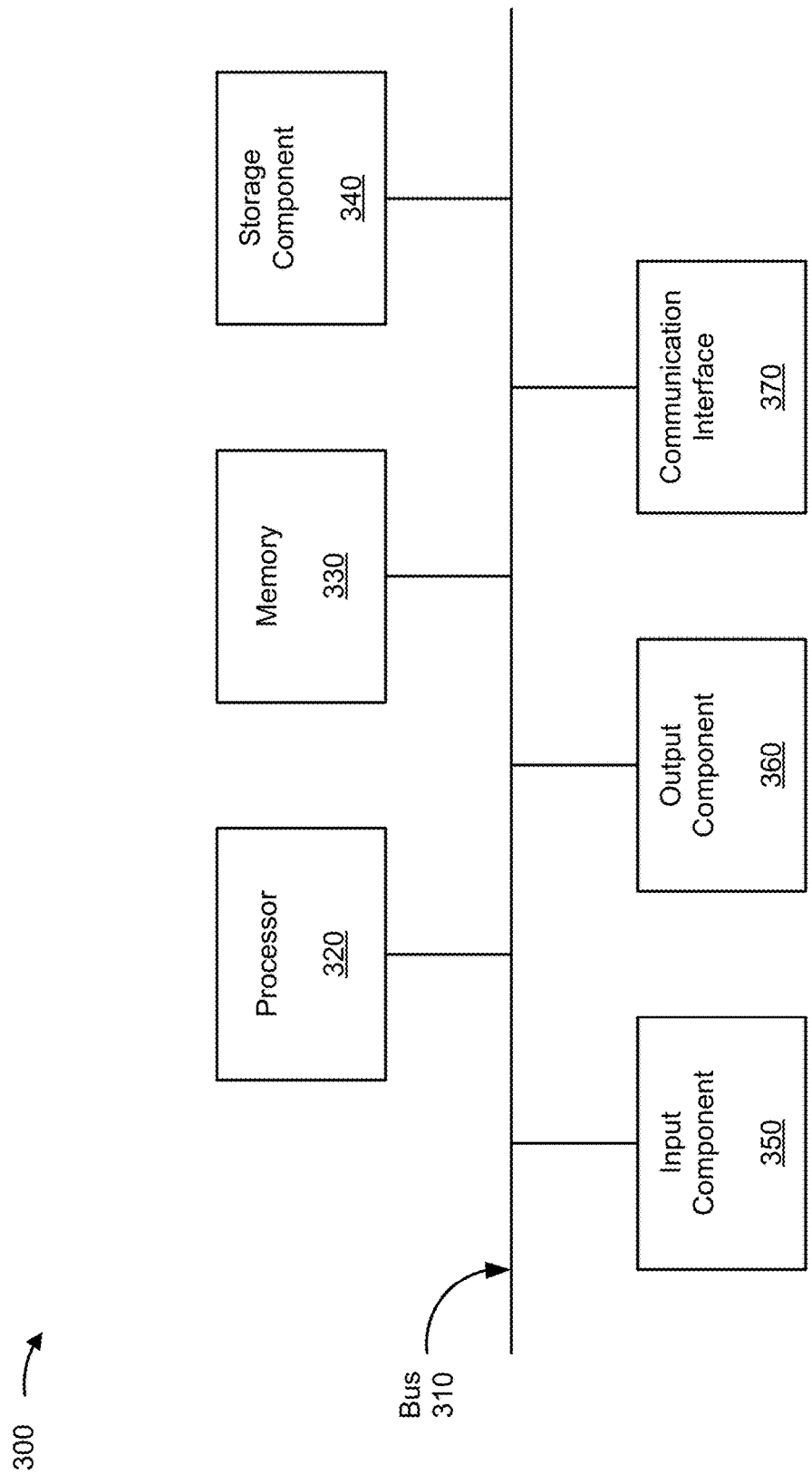
FIG. 3 is a diagram of example components of one or more devices of FIG. 2.

FIG. 3 is a diagram of example components of a device 300. Device 300 may correspond to user device 210, autonomous vehicle device 220, drive test vehicle device 230, geocoding server device 240, navigation platform 250, computing resource 254, and/or one or more devices included in network 260. In some implementations, user device 210, autonomous vehicle device 220, drive test vehicle device 230, geocoding server device 240, navigation platform 250, computing resource 254, and/or one or more devices included in network 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
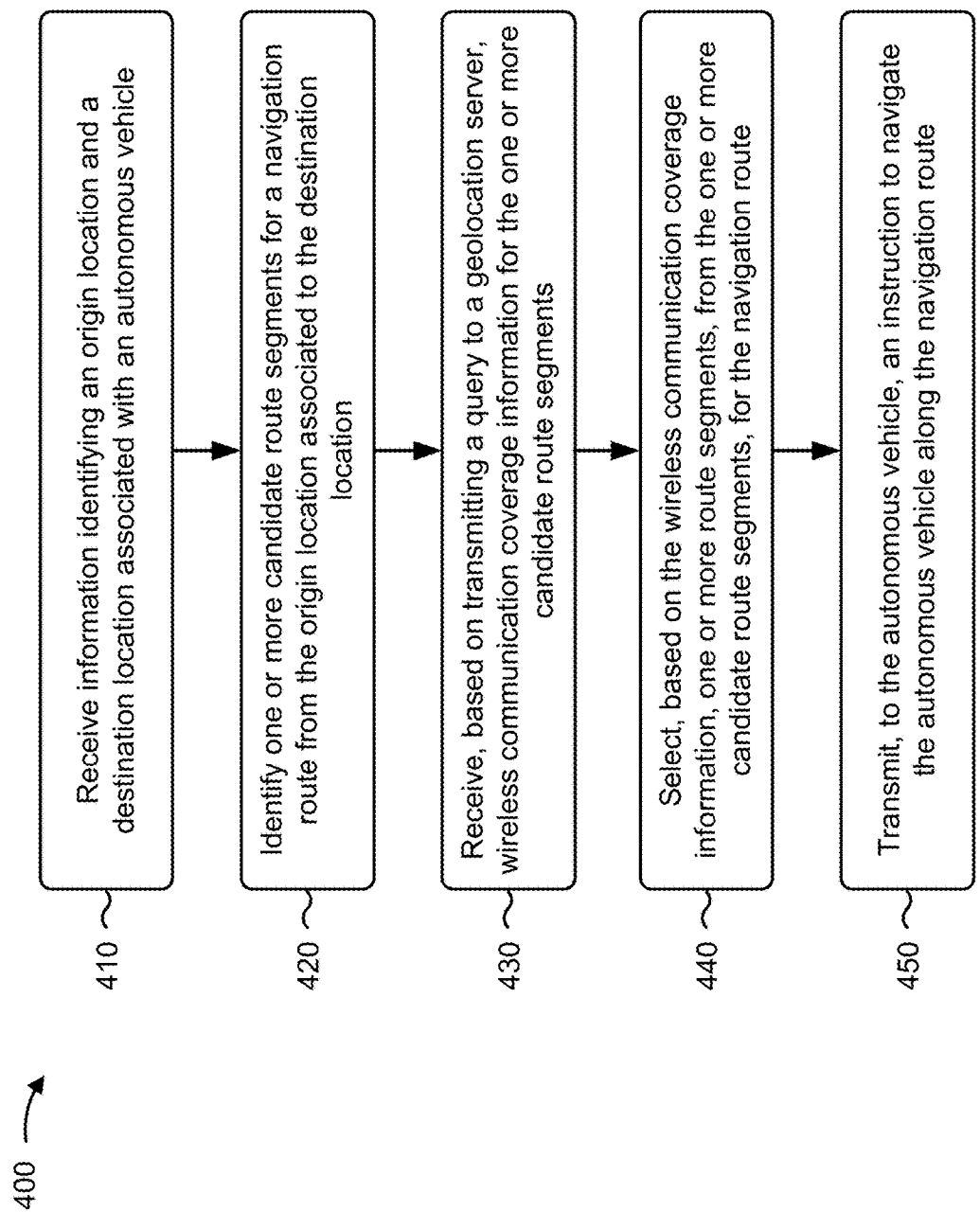
FIGS. 4-6 are flow charts of example processes for wireless communication coverage based vehicle routing.

FIG. 4 is a flow chart of an example process 400 for wireless communication coverage based vehicle routing. In some implementations, one or more process blocks of FIG. 4 may be performed by navigation platform (e.g., navigation platform 250). In some implementations, one or more process blocks of FIG. 4 may be performed by another device or a group of devices separate from or including the navigation platform, such as a user device (e.g., user device 210), an autonomous vehicle device (e.g., autonomous vehicle device 220), a drive test vehicle device (e.g., drive test vehicle device 230), a geocoding server device (e.g., geocoding server device 240), and/or the like.

As shown in FIG. 4, process 400 may include receiving, at a navigation platform, information identifying an origin location and a destination location associated with an autonomous vehicle (block 410). For example, the navigation platform (e.g., using processor 320, memory 330, storage component 340, input component 350, output component 360, communication interface 370 and/or the like) may receive, at a navigation platform, information identifying an origin location and a destination location associated with an autonomous vehicle, as described above.

As further shown in FIG. 4, process 400 may include identifying, by the navigation platform, one or more candidate route segments for a navigation route from the origin location to the destination location (block 420). For example, the navigation platform (e.g., using processor 320, memory 330, storage component 340, input component 350, output component 360, communication interface 370 and/or the like) may identify, by the navigation platform, one or more candidate route segments for a navigation route from the origin location to the destination location, as described above.

As further shown in FIG. 4, process 400 may include receiving, by the navigation platform and based on transmitting a query to a geolocation server, wireless communication coverage information for the one or more candidate route segments (block 430). For example, the navigation platform (e.g., using processor 320, memory 330, storage component 340, input component 350, output component 360, communication interface 370 and/or the like) may receive, by the navigation platform and based on transmitting a query to a geolocation server, wireless communication coverage information for the one or more candidate route segments, as described above.

As further shown in FIG. 4, process 400 may include selecting, by the navigation platform and based on the wireless communication coverage information, one or more route segments, from the one or more candidate route segments, for the navigation route (block 440). For example, the navigation platform (e.g., using processor 320, memory 330, storage component 340, input component 350, output component 360, communication interface 370 and/or the like) may select, by the navigation platform and based on the wireless communication coverage information, one or more route segments, from the one or more candidate route segments, for the navigation route, as described above.

As further shown in FIG. 4, process 400 may include transmitting, by the navigation platform and to the autonomous vehicle, an instruction to navigate the autonomous vehicle along the navigation route (block 450). For example, the navigation platform (e.g., using processor 320, memory 330, storage component 340, input component 350, output component 360, communication interface 370 and/or the like) may transmit, by the navigation platform and to the autonomous vehicle, an instruction to navigate the autonomous vehicle along the navigation route, as described above.

Process 400 may include additional implementations, such as any single implementation or any combination of implementations described below and/or in connection with one or more other processes described elsewhere herein.

In some implementations, the one or more candidate route segments are candidate route segments for a particular route segment included in the navigation route. In some implementations, selecting the one or more route segments comprises selecting the particular route segment from the one or more candidate route segments. In some implementations, selecting the one or more route segments comprises selecting respective candidate route segments, of the one or more candidate route segments, as respective route segments of the one or more route segments. In some implementations, the wireless communication coverage information comprises at least one of information identifying wireless communication coverage, provided by a plurality of different cellular networks, along the one or more candidate route segments or a recommendation for selecting the one or more route segments from the one or more candidate route segments.

In some implementations, the wireless communication coverage information comprises: an indication of whether wireless communication coverage, along a candidate route segment of the one or more candidate route segments, satisfies one or more wireless communication coverage thresholds. In some implementations, the one or more wireless communication coverage thresholds comprise at least one of a signal strength threshold, a signal quality threshold, a throughput threshold, a route segment coverage threshold, or, a latency threshold. In some implementations, selecting the one or more route segments comprises selecting the one or more route segments based on determining that wireless communication coverage for the one or more route segments satisfies the one or more wireless communication coverage thresholds.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
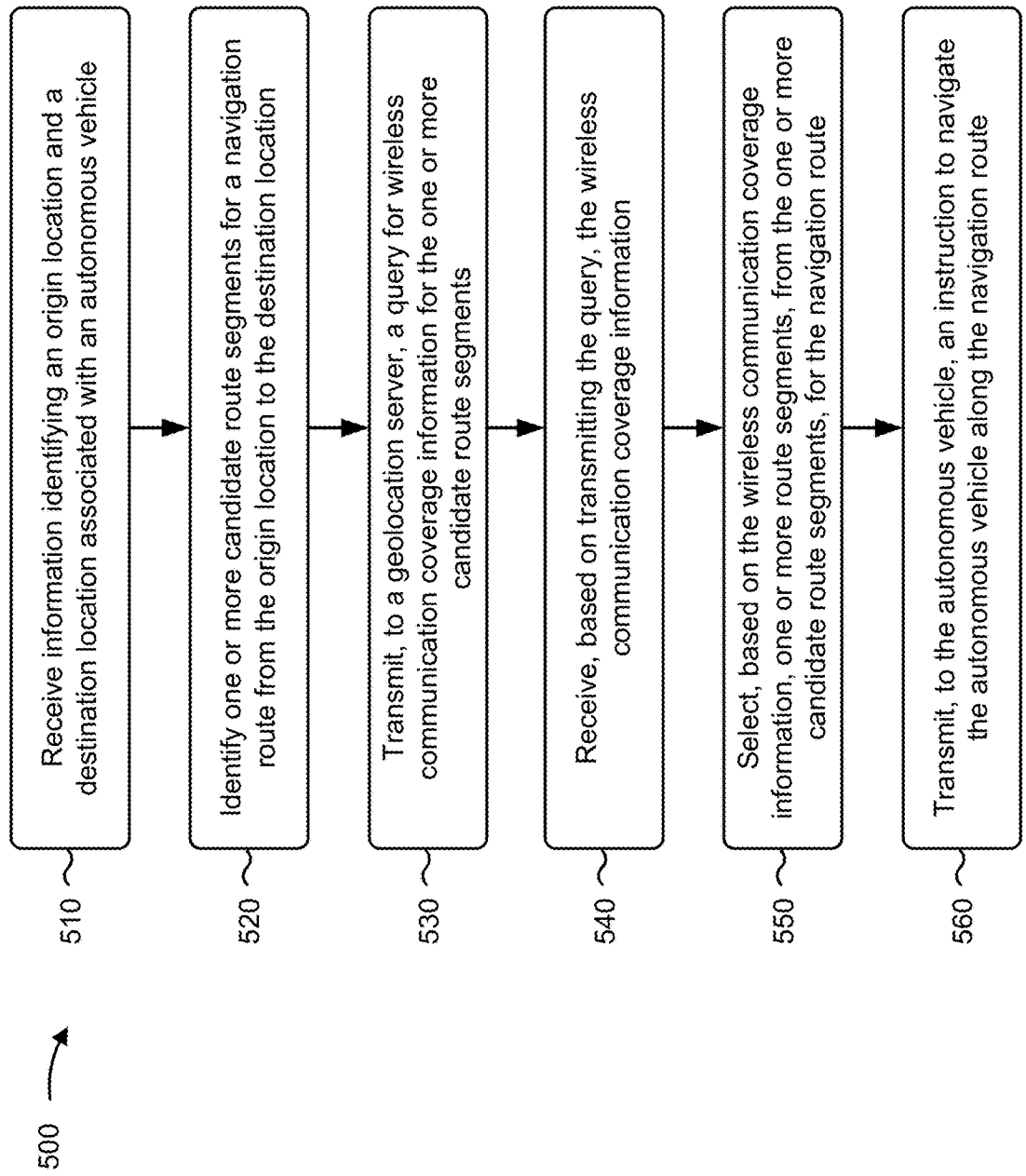

FIG. 5 is a flow chart of an example process 500 for wireless communication coverage based vehicle routing. In some implementations, one or more process blocks of FIG. 5 may be performed by navigation platform (e.g., navigation platform 250). In some implementations, one or more process blocks of FIG. 5 may be performed by another device or a group of devices separate from or including the navigation platform, such as a user device (e.g., user device 210), an autonomous vehicle device (e.g., autonomous vehicle device 220), a drive test vehicle device (e.g., drive test vehicle device 230), a geocoding server device (e.g., geocoding server device 240), and/or the like.

As shown in FIG. 5, process 500 may include receiving information identifying an origin location and a destination location associated with an autonomous vehicle (block 510). For example, the navigation platform (e.g., using processor 320, memory 330, storage component 340, input component 350, output component 360, communication interface 370 and/or the like) may receive information identifying an origin location and a destination location associated with an autonomous vehicle, as described above.

As further shown in FIG. 5, process 500 may include identifying one or more candidate route segments for a navigation route from the origin location associated with the autonomous vehicle (block 520). For example, the navigation platform (e.g., using processor 320, memory 330, storage component 340, input component 350, output component 360, communication interface 370 and/or the like) may identify one or more candidate route segments for a navigation route from the origin location to the destination location, as described above.

As further shown in FIG. 5, process 500 may include transmitting, to a geolocation server, a query for wireless communication coverage information for the one or more candidate route segments (block 530). For example, the navigation platform (e.g., using processor 320, memory 330, storage component 340, input component 350, output component 360, communication interface 370 and/or the like) may transmit, to a geolocation server, a query for wireless communication coverage information for the one or more candidate route segments, as described above.

As further shown in FIG. 5, process 500 may include receiving, based on transmitting the query, the wireless communication coverage information (block 540). For example, the navigation platform (e.g., using processor 320, memory 330, storage component 340, input component 350, output component 360, communication interface 370 and/or the like) may receive, based on transmitting the query, the wireless communication coverage information, as described above.

As further shown in FIG. 5, process 500 may include selecting, based on the wireless communication coverage information, one or more route segments, from the one or more candidate route segments, for the navigation route (block 550). For example, the navigation platform (e.g., using processor 320, memory 330, storage component 340, input component 350, output component 360, communication interface 370 and/or the like) may select, based on the wireless communication coverage information, one or more route segments, from the one or more candidate route segments, for the navigation route, as described above.

As further shown in FIG. 5, process 500 may include transmitting, to the autonomous vehicle, an instruction to navigate the autonomous vehicle along the navigation route (block 560). For example, the navigation platform (e.g., using processor 320, memory 330, storage component 340, input component 350, output component 360, communication interface 370 and/or the like) may transmit, to the autonomous vehicle, an instruction to navigate the autonomous vehicle along the navigation route, as described above.

Process 500 may include additional implementations, such as any single implementation or any combination of implementations described below and/or in connection with one or more other processes described elsewhere herein.

In some implementations, selecting the one or more route segments comprises selecting a route segment, of the one or more route segments, based on at least one of a travel distance associated with the route segment, a travel time associated with the route segment, predicted traffic conditions for the route segment, real-time traffic conditions for the route segment, or one or more points of interest (POIs) along the route segment. In some implementations, the wireless communication coverage information comprises information identifying wireless communication coverage, along the one or more candidate route segments, provided by one or more cellular networks and one or more Wi-Fi networks. In some implementations, the wireless communication coverage information comprises: an indication of whether wireless communication coverage, along a candidate route segment of the one or more candidate route segments, satisfies one or more user requirements.

In some implementations, the one or more user requirements comprise at least one of an audio streaming requirement, a video streaming requirement, a video call requirement, or, a data rate requirement. In some implementations, the wireless communication coverage information comprises an indication of one or more cellular networks that provide wireless communication coverage along the one or more candidate route segments. In some implementations, selecting the one or more route segments comprises selecting a candidate route segment, of the one or more candidate route segments, as a route segment of the one or more route segments based on determining that a particular cellular network provides wireless communication coverage along the candidate route segment.

In some implementations, the wireless communication coverage information comprises information identifying one or more capabilities of wireless communication coverage along the one or more candidate route segments. In some implementations, the one or more capabilities comprise at least one of a throughput capability range, a latency capability range, a signal strength capability range, or a signal quality capability range.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
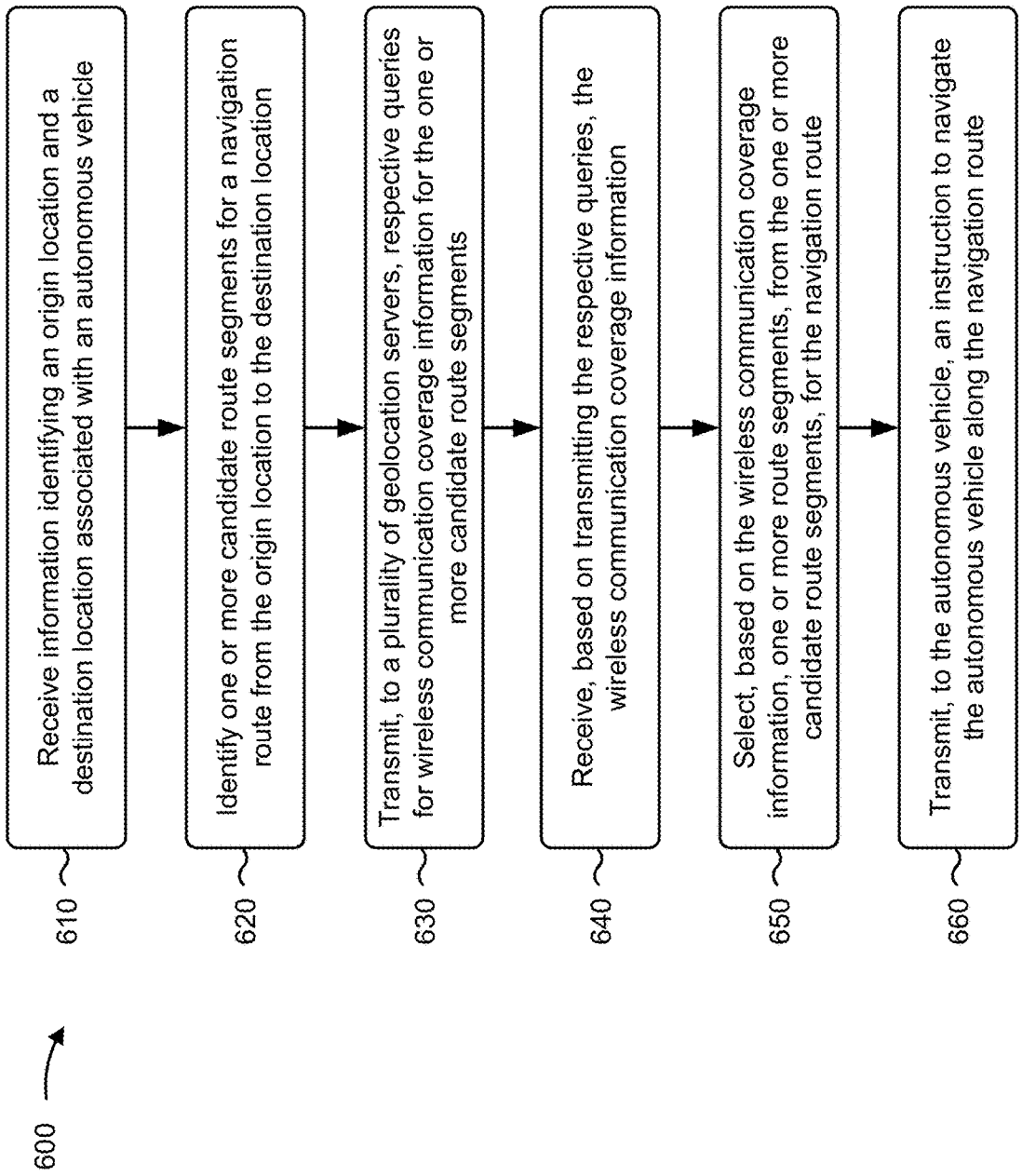

FIG. 6 is a flow chart of an example process 600 for wireless communication coverage based vehicle routing. In some implementations, one or more process blocks of FIG. 6 may be performed by navigation platform (e.g., navigation platform 250). In some implementations, one or more process blocks of FIG. 6 may be performed by another device or a group of devices separate from or including the navigation platform, such as a user device (e.g., user device 210), an autonomous vehicle device (e.g., autonomous vehicle device 220), a drive test vehicle device (e.g., drive test vehicle device 230), a geocoding server device (e.g., geocoding server device 240), and/or the like.

As shown in FIG. 6, process 600 may include receiving information identifying an origin location and a destination location associated with an autonomous vehicle (block 610). For example, the navigation platform (e.g., using processor 320, memory 330, storage component 340, input component 350, output component 360, communication interface 370 and/or the like) may receive information identifying an origin location and a destination location associated with an autonomous vehicle, as described above.

As further shown in FIG. 6, process 600 may include identifying one or more candidate route segments for a navigation route from the origin location to the destination location (block 620). For example, the navigation platform (e.g., using processor 320, memory 330, storage component 340, input component 350, output component 360, communication interface 370 and/or the like) may identify one or more candidate route segments for a navigation route from the origin location to the destination location, as described above.

As further shown in FIG. 6, process 600 may include transmitting, to a plurality of geolocation servers, respective queries for wireless communication coverage information for the one or more candidate route segments (block 630). For example, the navigation platform (e.g., using processor 320, memory 330, storage component 340, input component 350, output component 360, communication interface 370 and/or the like) may transmit, to a plurality of geolocation servers, respective queries for wireless communication coverage information for the one or more candidate route segments, as described above.

As further shown in FIG. 6, process 600 may include receiving, based on transmitting the respective queries, the wireless communication coverage information (block 640). For example, the navigation platform (e.g., using processor 320, memory 330, storage component 340, input component 350, output component 360, communication interface 370 and/or the like) may receive, based on transmitting the respective queries, the wireless communication coverage information, as described above.

As further shown in FIG. 6, process 600 may include selecting, based on the wireless communication coverage information, one or more route segments, from the one or more candidate route segments, for the navigation route (block 650). For example, the navigation platform (e.g., using processor 320, memory 330, storage component 340, input component 350, output component 360, communication interface 370 and/or the like) may select, based on the wireless communication coverage information, one or more route segments, from the one or more candidate route segments, for the navigation route, as described above.

As further shown in FIG. 6, process 600 may include transmitting, to the autonomous vehicle, an instruction to navigate the autonomous vehicle along the navigation route (block 660). For example, the navigation platform (e.g., using processor 320, memory 330, storage component 340, input component 350, output component 360, communication interface 370 and/or the like) may transmit, to the autonomous vehicle, an instruction to navigate the autonomous vehicle along the navigation route, as described above.

Process 600 may include additional implementations, such as any single implementation or any combination of implementations described below and/or in connection with one or more other processes described elsewhere herein.

In some implementations, the plurality of geolocation servers is associated with respective cellular networks. In some implementations, the wireless communication coverage information comprises: information identifying wireless communication coverage, along the one or more candidate route segments, provided by the respective cellular networks. In some implementations, the wireless communication coverage information comprises at least one of information identifying an estimated available network capacity, along a candidate route segment of the one or more candidate route segments, for a particular cellular network of the respective cellular networks, or information identifying an expected network outage, along the candidate route, in the particular cellular network.

In some implementations, the one or more candidate route segments are candidate route segments for a particular route segment included in the navigation route. In some implementations, selecting the one or more route segments comprises selecting the particular route segment from the one or more candidate route segments. In some implementations, selecting the one or more route segments comprises selecting respective candidate route segments, of the one or more candidate route segments, as respective route segments of the one or more route segments.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
  receiving, at a navigation platform, information identifying an origin location and a destination location associated with an autonomous vehicle;
  identifying, by the navigation platform, one or more candidate route segments for a navigation route from the origin location to the destination location,
    wherein a candidate route segment, of the one or more candidate route segments, comprises a portion of a route from the origin location to the destination location, and
    wherein the navigation route comprises an entire route from the origin location to the destination location;
  receiving, by the navigation platform and based on transmitting a query to a plurality of geolocation servers, wireless communication coverage information for the one or more candidate route segments,
    wherein a first geolocation server, of the plurality of geolocation servers, is associated with a first network operator,
    wherein a second geolocation server, of the plurality of geolocation servers, is associated with a second network operator, and
    wherein the wireless communication coverage information includes information identifying peak network capacity usage;

generating, by the navigation platform and based on the wireless communication coverage information, the navigation route based on selecting one or more route segments, from the one or more candidate route segments, for the navigation route,
　wherein selecting the one or more route segments comprises:
　　determining, based on the wireless communication coverage information, whether wireless communication coverage for particular candidate route segments, of the one or more candidate route segments, satisfies a threshold, and
　　selecting the one or more route segments, from the particular candidate route segments, based on determining that the wireless communication coverage for the particular candidate route segments satisfies the threshold; and
transmitting, by the navigation platform and to the autonomous vehicle, an instruction to navigate the autonomous vehicle along the navigation route.

2. The method of claim 1, wherein the one or more candidate route segments are candidate route segments for a particular route segment included in the navigation route; and
　wherein selecting the one or more route segments comprises:
　　selecting the particular route segment from the one or more candidate route segments.

3. The method of claim 1, wherein selecting the one or more route segments comprises:
　selecting respective candidate route segments, of the one or more candidate route segments, as respective route segments of the one or more route segments.

4. The method of claim 1, wherein the wireless communication coverage information comprises at least one of:
　information identifying wireless communication coverage, provided by a plurality of different cellular networks, along the one or more candidate route segments, or
　a recommendation for selecting the one or more route segments from the one or more candidate route segments.

5. The method of claim 1, wherein the wireless communication coverage information comprises:
　an indication of whether wireless communication coverage, along a candidate route segment of the one or more candidate route segments, satisfies one or more wireless communication coverage thresholds.

6. The method of claim 5, wherein the one or more wireless communication coverage thresholds comprise at least one of:
　a signal strength threshold,
　a signal quality threshold,
　a throughput threshold,
　a route segment coverage threshold, or
　a latency threshold.

7. The method of claim 5, wherein selecting the one or more route segments comprises:
　selecting the one or more route segments based on determining that wireless communication coverage for the one or more route segments satisfies the one or more wireless communication coverage thresholds.

8. A navigation platform, comprising:
one or more memories; and
one or more processors configured to:
　receive information identifying an origin location and a destination location associated with an autonomous vehicle;
　identify one or more candidate route segments for a navigation route from the origin location to the destination location,
　　wherein a candidate route segment, of the one or more candidate route segments, comprises a portion of a route from the origin location to the destination location, and
　　wherein the navigation route comprises an entire route from the origin location to the destination location;
　transmit, to a plurality of geolocation servers, a query for wireless communication coverage information for the one or more candidate route segments,
　　wherein a first geolocation server, of the plurality of geolocation servers, is associated with a first network operator,
　　wherein a second geolocation server, of the plurality of geolocation servers, is associated with a second network operator, and
　　wherein the wireless communication coverage information includes information identifying peak network capacity usage times;
　receive, based on transmitting the query, the wireless communication coverage information;
　generate, based on the wireless communication coverage information, the navigation route based on selecting one or more route segments, from the one or more candidate route segments, for the navigation route,
　　wherein the one or more processors, to select the one or more route segments, are configured to:
　　　determine, based on the wireless communication coverage information, whether wireless communication coverage for particular candidate route segments, of the one or more candidate route segments, satisfies a threshold, and
　　　select the one or more route segments, from the particular candidate route segments, based on determining that the wireless communication coverage for the particular candidate route segments satisfies the threshold; and
　transmit, to the autonomous vehicle, an instruction to navigate the autonomous vehicle along the navigation route.

9. The navigation platform of claim 8, wherein the one or more processors, when selecting the one or more route segments, are to:
　select a route segment, of the one or more route segments, based on at least one of:
　　a travel distance associated with the route segment,
　　a travel time associated with the route segment,
　　predicted traffic conditions for the route segment,
　　real-time traffic conditions for the route segment, or
　　one or more points of interest (POIs) along the route segment.

10. The navigation platform of claim 8, wherein the wireless communication coverage information comprises:
　information identifying wireless communication coverage, along the one or more candidate route segments, provided by:
　　one or more cellular networks, and
　　one or more Wi-Fi networks.

11. The navigation platform of claim 8, wherein the wireless communication coverage information comprises:

an indication of whether wireless communication coverage, along a candidate route segment of the one or more candidate route segments, satisfies one or more user requirements.

12. The navigation platform of claim 11, wherein the one or more user requirements comprise at least one of:
   an audio streaming requirement,
   a video streaming requirement,
   a video call requirement, or
   a data rate requirement.

13. The navigation platform of claim 8, wherein the wireless communication coverage information comprises:
   an indication of one or more cellular networks that provide wireless communication coverage along the one or more candidate route segments; and
   wherein the one or more processors, when selecting the one or more route segments, are to:
      select a candidate route segment, of the one or more candidate route segments, as a route segment of the one or more route segments based on determining that a particular cellular network provides wireless communication coverage along the candidate route segment.

14. The navigation platform of claim 8, wherein the wireless communication coverage information comprises:
   information identifying one or more capabilities of wireless communication coverage along the one or more candidate route segments,
      wherein the one or more capabilities comprise at least one of:
         a throughput capability range,
         a latency capability range,
         a signal strength capability range, or
         a signal quality capability range.

15. A non-transitory computer-readable medium storing instructions, the instructions comprising:
   one or more instructions that, when executed by one or more processors of a navigation platform, cause the one or more processors to:
      receive information identifying an origin location and a destination location associated with an autonomous vehicle;
      identify one or more candidate route segments for a navigation route from the origin location to the destination location,
         wherein a candidate route segment, of the one or more candidate route segments, comprises a portion of a route from the origin location to the destination location, and
         wherein the navigation route comprises an entire route from the origin location to the destination location;
      transmit, to a plurality of geolocation servers, respective queries for wireless communication coverage information for the one or more candidate route segments,
         wherein a first geolocation server, of the plurality of geolocation servers, is associated with a first network operator,
         wherein a second geolocation server, of the plurality of geolocation servers, is associated with a second network operator, and
         wherein the wireless communication coverage information includes information identifying peak network capacity usage times;
      receive, based on transmitting the respective queries, the wireless communication coverage information;
      generate, based on the wireless communication coverage information, the navigation route based on selecting one or more route segments, from the one or more candidate route segments, for the navigation route,
         wherein the one or more instructions, that cause the one or more processors to select the one or more route segments, cause the one or more processors to:
            determine, based on the wireless communication coverage information, whether wireless communication coverage for particular candidate route segments, of the one or more candidate route segments, satisfies a threshold, and
            select the one or more route segments, from the particular candidate route segments, based on determining that the wireless communication coverage for the particular candidate route segments satisfies the threshold; and
      transmit, to the autonomous vehicle, an instruction to navigate the autonomous vehicle along the navigation route.

16. The non-transitory computer-readable medium of claim 15, wherein the plurality of geolocation servers are associated with respective cellular networks.

17. The non-transitory computer-readable medium of claim 16, wherein the wireless communication coverage information comprises:
   information identifying wireless communication coverage, along the one or more candidate route segments, provided by the respective cellular networks.

18. The non-transitory computer-readable medium of claim 16, wherein the wireless communication coverage information comprises at least one of:
   information identifying an estimated available network capacity, along a candidate route segment of the one or more candidate route segments, for a particular cellular network of the respective cellular networks, or
   information identifying an expected network outage, along the candidate route segment, in the particular cellular network.

19. The non-transitory computer-readable medium of claim 15, wherein the one or more candidate route segments are candidate route segments for a particular route segment included in the navigation route; and
   wherein the one or more instructions, that cause the one or more processors to select the one or more route segments, cause the one or more processors to:
      select the particular route segment from the one or more candidate route segments.

20. The non-transitory computer-readable medium of claim 15, wherein the one or more instructions, that cause the one or more processors to select the one or more route segments, cause the one or more processors to:
   select respective candidate route segments, of the one or more candidate route segments, as respective route segments of the one or more route segments.

* * * * *